US009222564B2

(12) United States Patent
Kawahara et al.

(10) Patent No.: US 9,222,564 B2
(45) Date of Patent: Dec. 29, 2015

(54) LOCK-UP DEVICE FOR TORQUE CONVERTER

(75) Inventors: Yuki Kawahara, Osaka (JP); Hiroyuki Ushio, Shijonawate (JP); Naoki Tomiyama, Hirakata (JP)

(73) Assignee: EXEDY Corporation, Osaka (JP)

( * ) Notice: Subject to any disclaimer, the term of this patent is extended or adjusted under 35 U.S.C. 154(b) by 44 days.

(21) Appl. No.: 14/241,946

(22) PCT Filed: Aug. 9, 2012

(86) PCT No.: PCT/JP2012/070355
§ 371 (c)(1),
(2), (4) Date: Feb. 28, 2014

(87) PCT Pub. No.: WO2013/038853
PCT Pub. Date: Mar. 21, 2013

(65) Prior Publication Data
US 2014/0209423 A1    Jul. 31, 2014

(30) Foreign Application Priority Data

Sep. 13, 2011 (JP) ................................ 2011-199009
Sep. 20, 2011 (JP) ................................ 2011-204182

(51) Int. Cl.
*F16H 45/02* (2006.01)
*F16F 15/134* (2006.01)

(52) U.S. Cl.
CPC .............. *F16H 45/02* (2013.01); *F16F 15/134* (2013.01); *F16H 2045/0205* (2013.01); *F16H 2045/0226* (2013.01); *F16H 2045/0231* (2013.01); *F16H 2045/0289* (2013.01); *F16H 2045/0294* (2013.01)

(58) Field of Classification Search
CPC ................ F16H 2015/0231; F16H 2045/0226; F16H 2045/0289
See application file for complete search history.

(56) References Cited

U.S. PATENT DOCUMENTS

| 4,875,562 A | 10/1989 | Fujimoto |
| 5,743,365 A | 4/1998 | Makino |
| 5,799,761 A | 9/1998 | Arhab |
| 6,244,401 B1 * | 6/2001 | Maienschein et al. ......... 192/3.3 |
| 6,675,457 B1 * | 1/2004 | Redmond et al. ............... 29/509 |
| 2001/0008198 A1 | 7/2001 | Maienschein et al. |
| 2007/0256905 A1 * | 11/2007 | Brees et al. .................. 192/3.29 |

FOREIGN PATENT DOCUMENTS

| JP | S63-128359 U | 8/1988 |
| JP | H08-303554 A | 11/1996 |

(Continued)

*Primary Examiner* — Richard Lorence
(74) *Attorney, Agent, or Firm* — Global IP Counselors, LLP (57) ABSTRACT

A lock-up device basically includes a piston, a first plate, a second plate, a plurality of outer peripheral side torsion springs and a plurality of inner peripheral side torsion springs. The piston is configured to press a friction member that is fixed to a lateral surface of the piston onto a front cover or release pressing of the friction member. Further, the piston has a plurality of engaging portions formed by partially bending the piston towards the turbine. The second plate is coupled to the turbine. The outer peripheral side torsion springs are disposed between the piston and the first plate. The outer peripheral side torsion springs are configured to transmit torque from the piston to the first plate while the circumferential ends thereof are engaged with the engaging portions of the piston.

12 Claims, 9 Drawing Sheets

(56) References Cited

FOREIGN PATENT DOCUMENTS

| | | |
|---|---|---|
| JP | H09-507903 A | 8/1997 |
| JP | 2000-002312 A | 1/2000 |
| JP | 2009-250288 A | 10/2009 |
| JP | 2011-052726 A | 3/2011 |
| JP | 2011-122640 A | 6/2011 |
| WO | 2011024640 A1 | 3/2011 |

* cited by examiner

LOCK-UP DEVICE FOR TORQUE CONVERTER

CROSS-REFERENCE TO THE RELATED APPLICATIONS

This U.S. national phase application claims priority to Japanese Patent Application Nos. 2011-199009 and 2011-204182 respectively filed on Sep. 13, 2011 and Sep. 20, 2011. The entire disclosures of Japanese Patent Application Nos. Nos. 2011-199009 and 2011-204182 are hereby incorporated herein by reference

TECHNICAL FIELD

The present invention relates to a lock-up device, particularly to a lock-up device for a torque converter, which is disposed between a front cover coupled to an engine-side member and a turbine of the torque converter in order to mechanically transmit torque from the front cover to the turbine.

BACKGROUND ART

As described in Japan Laid-Open Patent Application Publication No. 2011-122640 or Japan Laid-Open Patent Application Publication No. JP-A-2009-250288, torque converters are often provided with a lock-up device for directly transmitting torque from a front cover to a turbine. The lock-up devices described in the PTLs include: a piston that can be frictionally coupled to the front cover; a retaining plate fixed to the piston; a plurality of torsion springs disposed on the outer peripheral side and the inner peripheral side in the radial direction; and a driven plate for transmitting torque transmitted thereto through the plural torsions springs to the turbine.

The outer peripheral side torsion springs and the inner peripheral side torsion springs are herein coupled by a pair of plates fixed to each other by rivets. Specifically, the inner peripheral side torsion springs are disposed between a first plate and a second plate, and are accommodated in spring accommodation portions formed in the both plates. Further, the circumferential ends of each spring accommodation portion can be engaged with the circumferential ends of each inner peripheral side torsion spring. Moreover, the outer peripheral part of the first plate is formed so as to be extending to the outer peripheral side torsion springs, and is engaged with the circumferential ends of the outer peripheral side torsion springs.

On the other hand, the outer peripheral end portion of the driven plate extends to the position between the first plate and the second plate, and has window holes formed for accommodating the inner peripheral side torsion springs. The inner peripheral part of the driven plate is fixed to the turbine.

The retaining plate is herein provided for transmitting torque from the piston to the outer peripheral side torsion springs. The retaining plate is fixed to the turbine-side lateral surface of the piston by rivets or the like. Further, the outer peripheral part of the retaining plate is partially bent towards the turbine, and the bent portions are engaged with the circumferential ends of the outer peripheral side torsion springs.

In such a lock-up device, torque is transmitted from the piston to the outer peripheral side torsion springs through the retaining plate, and is further transmitted to the inner peripheral side torsion springs through the first and second plates. Then, the torque transmitted to the inner peripheral side torsion springs is transmitted to the turbine through the driven plate.

SUMMARY

In such well-known lock-up devices as described in the above-mentioned Japanese publications, the part in which the inner peripheral side torsion springs are disposed is especially formed with a large axial length. Reduction in axial dimension of respective components has been required for reducing the axial length of the entire torque converter including the lock-up device.

However, the part in which the inner peripheral side torsion springs are disposed is often designed to be radially overlapped with the axially most bulged part of the main body of the torque converter. Therefore, the axial length of the entire torque converter is inevitably increased when the part in which the inner peripheral side torsion springs are disposed is formed with a large axial length. This hinders reduction in size of the torque converter.

Further, the lock-up device has been demanded to reduce the number of components for reducing the manufacturing cost thereof.

It is an advantage of the present invention to reduce the axial dimension in a lock-up device, compactly produce the axial space occupied by the entire torque converter, and reduce the number of components.

Further, it is another advantage of the present invention to reduce, particularly, the axial length of a part in which torsion springs composing a lock-up device are disposed, and thereby, to reduce the axial length of the entire torque converter.

A lock-up device for a torque converter according to a first aspect of the present invention is a device that is disposed between a front cover coupled to an engine-side member and a turbine of a torque converter and is configured to mechanically transmit torque from the front cover to the turbine. The lock-up device includes a piston, an output plate and a plurality of elastic members. The piston has a friction member on a front-cover-side lateral surface thereof, and is configured to be axially moved for allowing the friction member to be pressed onto or separated away from the front cover. Further, the piston has a plurality of engaging portions formed by partially bending the piston towards the turbine. The output plate is coupled to the turbine. The plural elastic members are disposed between the piston and the output plate, and are configured to transmit torque from the piston towards the output plate while circumferential ends thereof are engaged with the engaging portions of the piston.

In the present lock-up device, when the friction member of the piston is pressed onto the front cover, torque is inputted into the piston from the front cover. The torque is inputted into the elastic members through the engaging portions partially formed on the piston. The torque, which is inputted into the elastic members, is outputted to the turbine through the output plate.

The torque from the piston is herein inputted into the elastic members through the engaging portions formed partially on the piston. In other words, a retaining plate of a well-known device is not herein provided. Therefore, the axial dimension of the lock-up device can be reduced. Further, the number of components is herein reduced in comparison with the well-known device.

A lock-up device for a torque converter according to a second aspect of the present invention relates to the lock-up device of the first aspect, wherein the piston is an annular plate member. Further, each of the plural engaging portions is formed by bending a portion of the piston, which has a predetermined length from an outer peripheral end of the piston towards an inner periphery of the piston, towards the turbine.

Yet further, the friction member is an annular member attached to an outer peripheral end portion of the piston, and has cutouts in positions corresponding to the engaging portions formed in the outer peripheral end portion of the piston.

Here, the engaging portions are formed by partially bending the outer peripheral end portion of the piston. The friction member is herein disposed on the outer peripheral part of the piston. However, the part, in which the engaging portions are formed, lacks of backup portions for the friction member.

In view of the above, the device of the second aspect is provided with cutouts in positions corresponding to the piston engaging portions of the friction member. The cutouts function as lubricating oil accumulating portions. Therefore, the cooling performance is herein enhanced, and this is especially effective in performing a slip control of making the friction member simultaneously slip and actuate in a lock-up device.

A lock-up device for a torque converter according to a third aspect of the present invention relates to the lock-up device of the first or second aspect, and further includes a support member that is disposed so as to be rotatable relatively to the piston and the output plate and causes adjacent two of the elastic members to act in series. The support member has: an outer periphery support portion covering an outer peripheral side part of each of the elastic members; a lateral part support portion covering a lateral part of each of the elastic members on an opposite side of the piston; and an inner periphery support portion covering an inner peripheral side part of each of the elastic members.

The support member is herein provided for causing adjacent two of the plural elastic members to act in series. Further, the elastic members are restricted from moving to the inner and outer peripheral sides by the support member, while being restricted from axially moving by the piston and the support member. Therefore, the piston is not required to be provided with a structure for restricting moving of the elastic members. The piston is thereby simply structured.

A lock-up device for a torque converter according to a fourth aspect of the present invention relates to the lock-up device of any the first to third aspects, wherein the output plate includes a first plate and a second plate. The first plate has a plurality of engaging portions, which are engaged with circumferential ends of the plural elastic members, on an outer peripheral part thereof, and has a plurality of first elastic member accommodating portions. The second plate is coupled to the turbine, and has a plurality of second elastic member accommodating portions disposed axially in opposition to the first elastic member accommodating portions. Moreover, the lock-up device further includes a plurality of support members and a plurality of inner peripheral side elastic members. The plural support members support the second plate such that the second plate is rotatable relatively to the first plate within a predetermined angular range and is axially immovable relatively to the first plate. The plural inner peripheral side elastic members are disposed on an inner peripheral side of the elastic members, and are accommodated between the first elastic member accommodating portions and the second elastic member accommodating portions.

In the present lock-up device, the first plate and the second plate are coupled to each other, while being rotatable relatively to each other within a predetermined angular range. Simultaneously, the inner peripheral side elastic members are accommodated between the both plates. Further, the torque, which is inputted into the piston from the front cover, is transmitted to the first plate from the elastic members and is transmitted to the second plate through the inner peripheral side elastic members. Yet further, the torque is outputted to the turbine from the second plate.

Torque is herein inputted into the inner peripheral side elastic members by the pair of plates that accommodate the inner peripheral side elastic members, while being outputted to the turbine from the inner peripheral side elastic members. Therefore, the axial dimension can be herein reduced in comparison with such a structure of a well-known device that the input-side and output-side parts of the inner peripheral side elastic members are composed of a pair of input plates and an output plate disposed between the pair of input plates. Further, the number of components can be herein reduced. Therefore, size reduction and cost reduction can be herein achieved.

A lock-up device for a torque converter according to a fifth aspect of the present invention relates to the lock-up device of the fourth aspect, wherein the second plate has a plurality of elongated holes formed in a circular-arc shape and are circumferentially extending. Further, each of the support members has: a circular trunk portion passing through each of the elongated holes; a head portion that has a diameter larger than a diameter of the trunk portion and makes contact with a lateral surface of the second plate on an opposite side of the first plate; and a swage portion swaged to a lateral surface of the first plate on an opposite side of the second plate.

Here, each support member has the circular trunk portion, the head portion and the swage portion. The circular trunk portion passes through each circular-arc elongated hole bored in the second plate. The swage portion is swaged to the first plate. Therefore, the second plate is rotatable relatively to the first plate by the clearance produced between the circular trunk portion and the elongated hole. Further, the first plate and the second plate are connected by the head portions and the swage portions, while being axially immovable from each other.

A lock-up device for a torque converter according to a sixth aspect of the present invention relates to the lock-up device of the fourth or fifth aspect, wherein the first plate is contactable with an axially middle part of both circumferential ends of the inner peripheral side elastic members on an outer peripheral side of each of the inner peripheral side elastic members. The second plate is contactable with an axially middle part of both circumferential ends of the inner peripheral side elastic member on an inner peripheral side of each of the inner peripheral side elastic members.

Here, one circumferential end of each inner peripheral side elastic member is pressed by the single first plate, whereas the other circumferential end of each inner peripheral side elastic member presses the single second plate. In other words, each of the circumferential ends of each inner peripheral side elastic member is supposed to make contact with the single plate. Therefore, when one of the plates is caused to make contact with the axially middle part of each inner peripheral side elastic member, the other of the plates is supposed to make contact with each inner peripheral side elastic member at a position displaced from the axially middle part. In such structure, the inner peripheral side elastic members are supposed to be twisted and deformed when being pressed with the respective plates.

In view of the above, according to the device of the sixth aspect, the first plate is caused to make contact with the axially middle part of both circumferential ends of each inner peripheral side elastic member on the outer peripheral side of each inner peripheral side elastic member, whereas the second plate is caused to make contact with the axially middle part of both circumferential ends of each inner peripheral side elastic member on the inner peripheral side of the inner peripheral side elastic member.

As described above, the first plate makes contact with the axially middle part of each inner peripheral side elastic member on the outer peripheral side, and the second plate makes contact with the axially middle part of each inner peripheral side elastic member on the inner peripheral side. Therefore, twisting of each inner peripheral side elastic member can be suppressed when being elastically deformed.

A lock-up device for a torque converter according to a seventh aspect of the present invention relates to the lock-up device of any of the fourth to sixth aspects, wherein the support member further has an inner protruding portion formed so as to be extending from the inner periphery support portion to a further inner peripheral side. Further, the support member is radially positioned while an inner peripheral side surface of the inner periphery support portion of the support member makes contact with an outer peripheral end surface of the second plate. Yet further, the support member is axially positioned while the inner protruding portion of the support member is disposed between the outer peripheral part of the first plate and an outer peripheral part of the second plate.

The first plate is herein radially and axially positioned by the plural support protrusions formed on the second plate. Therefore, the axis alignment of the first plate can be performed with a simple structure.

A lock-up device for a torque converter according to an eighth aspect of the present invention is a device that is disposed between a front cover coupled to an engine-side member and a turbine of the torque converter and is configured to mechanically transmit torque from the front cover to the turbine. The lock-up device includes a piston, a clutch part, a first plate, a second plate, a plurality of support members and a plurality of elastic members. The piston is disposed so as to be axially movable. The clutch part is configured to transmit or cut torque from the front cover to an output side in conjunction with moving of the piston. The first plate is a member into which torque is inputted from the front cover through the clutch part and has a plurality of first elastic member accommodating portions. The second plate is coupled to the turbine, and has a plurality of second elastic member accommodating portions that are disposed axially in opposition to the plural first elastic member accommodating portions. The plural support members support the second plate such that the second plate is rotatable relatively to the first plate within a predetermined angular range and is axially immovable relatively to the first plate. The plural elastic members are disposed axially between the first elastic member accommodating portions and the second elastic member accommodating portions. Both circumferential ends of each of the elastic members are allowed to be engaged with a circumferential end of each of the first elastic member accommodating portions and a circumferential end of each of the second elastic member accommodating portions. The elastic members elastically couple the first plate and the second plate in a rotational direction.

In the present lock-up device, the first plate and the second plate are coupled while being rotatable relatively to each other within a predetermined angular range. Simultaneously, the elastic members are accommodated between the both plates. Further, torque inputted from the front cover is inputted into the first plate through the clutch part, and is then inputted into the elastic members from the first plate. The torque is then transmitted to the second plate through elastic deformation of the elastic members. Further, the torque is outputted to the turbine through the second plate.

Torque is herein inputted into the elastic members by the pair of plates accommodating the elastic members, while being outputted to the turbine from the elastic members by the pair of plates. Therefore, the axial length can be herein reduced in comparison with such a structure of a well-known device that the input-side and output-side parts of the elastic members are composed of a pair of input plates and an output plate disposed between the pair of input plates. Further, the number of components can be herein reduced. Therefore, size reduction and cost reduction can be herein achieved.

A lock-up device for a torque converter according to a ninth aspect of the present invention relates to the lock-up device of the eighth aspect, wherein the second plate has a plurality of support protrusions that are disposed on an outer peripheral portion of the second plate coupling part coupled to the turbine and are protruding towards the first plate. Further, the first plate is formed in an annular shape, and an inner peripheral end of the first plate is radially positioned while being supported by the plural support protrusions.

The first plate is radially positioned by the plural support protrusions formed on the second plate. Therefore, the axis alignment of the first plate can be performed with a simple structure.

A lock-up device for a torque converter according to a tenth aspect of the present invention relates to the lock-up device of the eighth or ninth aspect, wherein the piston is a plate member disposed between the front cover and the plural elastic members, and the clutch part includes a friction member fixed to a front-cover-side lateral surface of the piston.

Torque from the front cover is herein transmitted to the piston through the friction member made in the form of a single plate, and is further transmitted to the first plate.

A lock-up device for a torque converter according to an eleventh aspect of the present invention relates to the lock-up device of the tenth aspect, and further includes a plurality of outer peripheral side elastic members that are circumferentially disposed in alignment with each other on an outer peripheral side of the elastic members and circumferentially and elastically couple the piston and the first plate. Further, the first plate has a plurality of first-plate-side engaging portions, which are allowed to be engaged with circumferential ends of the plural outer peripheral side elastic members, on an outer peripheral end portion thereof.

Torque from the piston is herein inputted into the outer peripheral side elastic members. The first-plate-side engaging portions of the first plate are engaged with the outer peripheral side elastic members. Torque from the outer peripheral side elastic members is transmitted to the first plate through the engaging portions, and is further transmitted to the turbine through the elastic members and the second plate.

A lock-up device for a torque converter according to a twelfth aspect of the present invention relates to the lock-up device of the eleventh aspect, wherein the piston has a plurality of piston-side engaging portions that are formed by partially bending an outer peripheral part of the piston towards the transmission and are engaged with the circumferential ends of the outer peripheral side elastic members.

In a well-known lock-up device, torque from the piston is transmitted to the outer peripheral side elastic members through a retaining plate fixed to a piston.

However, in the present device of the twelfth aspect, the outer peripheral part of the piston is partially bent, and the bent portions are engaged with the outer peripheral side elastic members. Therefore, the retaining plate provided for the well-known device is not herein required.

A lock-up device for a torque converter according to a thirteenth aspect of the present invention relates to the lock-up device of any of the tenth to twelfth aspects, and further includes a support member that is disposed so as to be rotatable relatively to the piston and the first plate and causes adjacent two of the plural outer peripheral side elastic members to act in series. The support member has an outer periphery support portion covering an outer peripheral side part of each of the outer peripheral side elastic members, a lateral part support portion covering one lateral part of each of the outer peripheral side elastic members, and an inner periphery support portion covering an inner peripheral side part of each of the outer peripheral side elastic members, and further has an inner protruding portion formed so as to extend from the inner periphery support portion to a further inner peripheral side. Further, the support member is radially positioned while an inner peripheral surface of the inner periphery support portion makes contact with an outer peripheral end surface of the second plate. Yet further, the support member is axially positioned while the inner protruding portion is disposed between an outer peripheral part of the first plate and an outer peripheral part of the second plate.

Here, the support member is provided for causing adjacent two of the plural outer peripheral side elastic members to act in series. Further, the support member is radially and axially positioned by the first plate and the second plate.

DETAILED DESCRIPTION OF THE EMBODIMENTS

Figure 1:
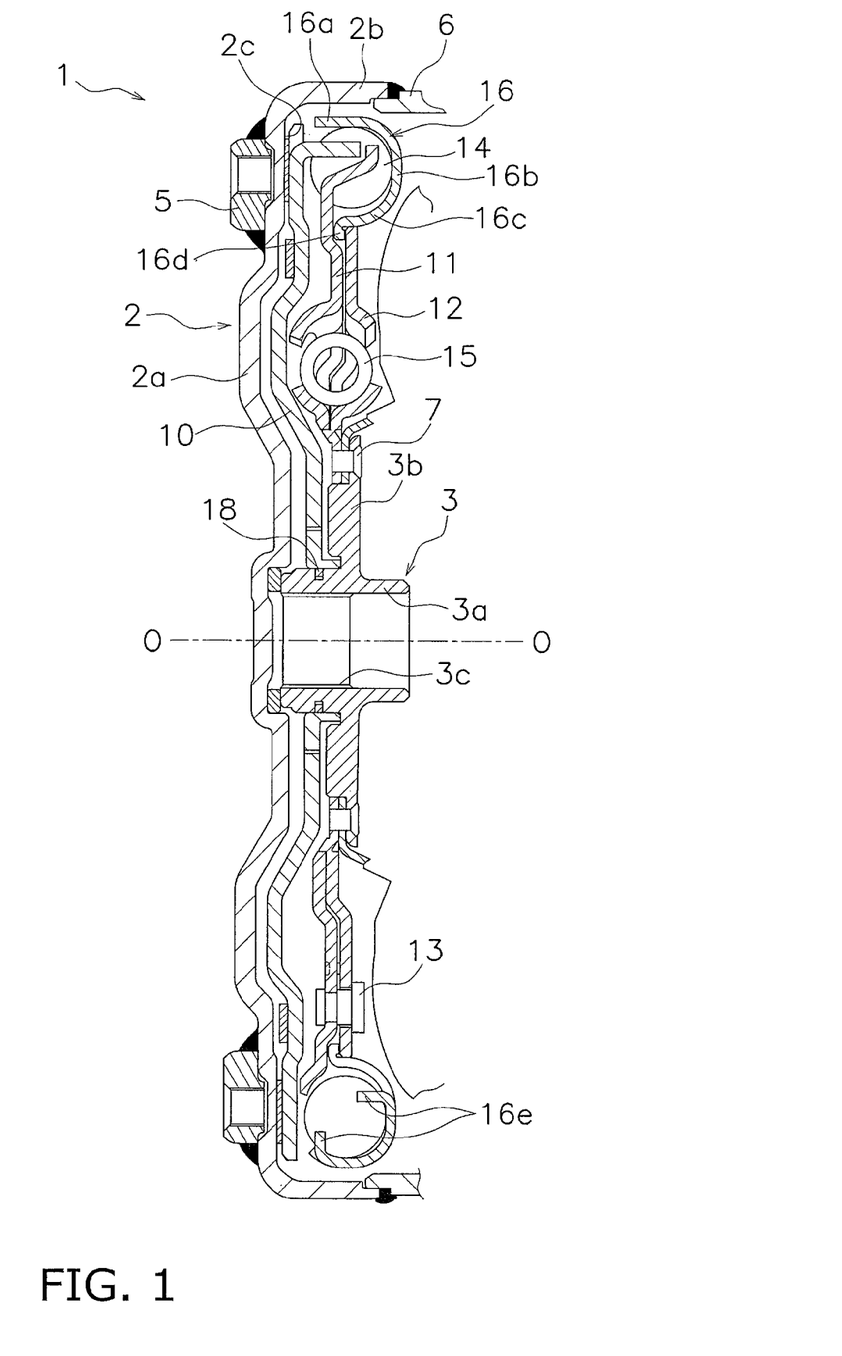
FIG. 1 is a cross-sectional structural view of a lock-up device according to an exemplary embodiment of the present invention.
Figure 2:
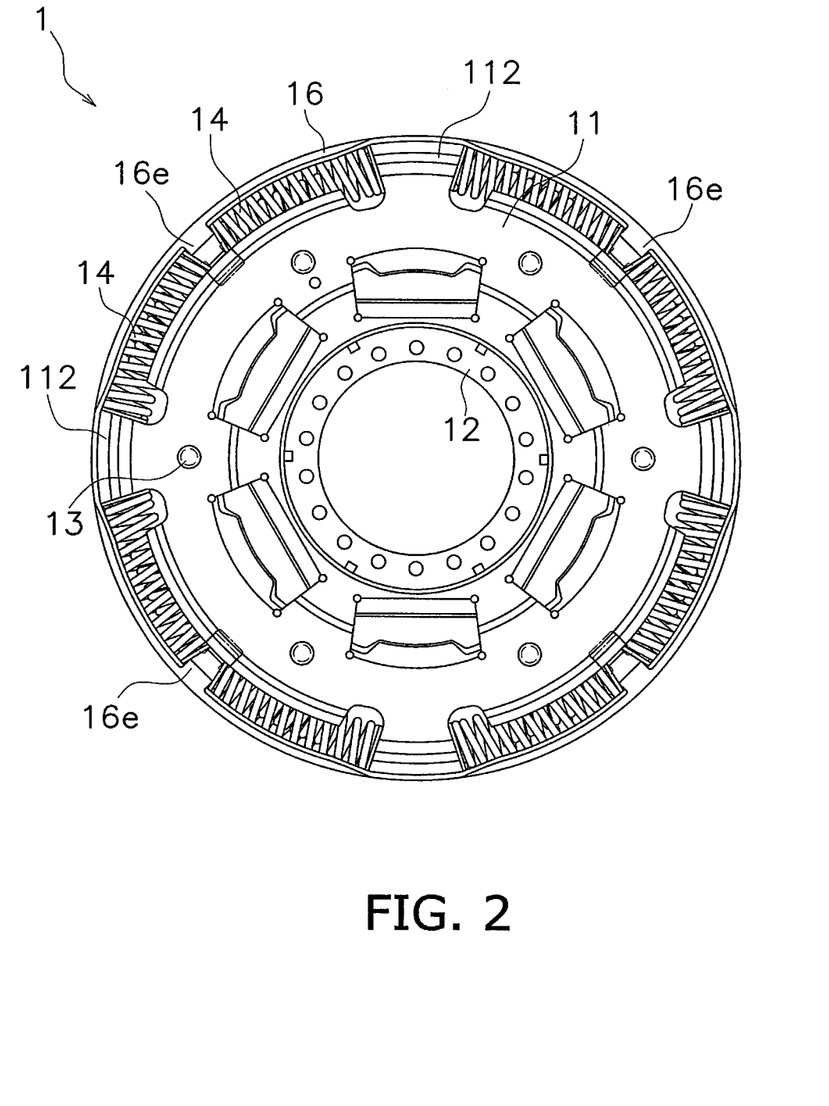
FIG. 2 is a front view of the lock-up device.

FIGS. 1 and 2 illustrate a lock-up device 1 of a torque converter according to an exemplary embodiment of the present invention. Regarding the components of the torque converter, a front cover 2 and a turbine hub 3 as a part of a turbine are only illustrated whereas the other components are not illustrated. It should be noted that an engine is disposed on the left side in FIG. 1, whereas the torque converter and a transmission are disposed on the right side in FIG. 1. A line O-O depicted in FIG. 1 indicates the rotary axis of the torque converter and the lock-up device 1. On the other hand, FIG. 2 illustrates the lock-up device 1 that some of the components (the front cover, a piston, inner peripheral side torsion springs) are detached therefrom.

Front Cover and Turbine Hub

The front cover 2 is a member to which torque is inputted through a flexible plate (not illustrated in the figures). The front cover 2 has a disc portion 2a and a tubular portion 2b extending from the outer peripheral edge of the disc portion 2a towards the transmission. The disc portion 2a has a friction surface 2c formed on the outer peripheral part of the transmission-side lateral surface thereof. A plurality of nuts 5 are fixed to the outer peripheral part of the engine-side lateral surface of the disc portion 2a by welding. The flexible plate (not illustrated in the figures) is attached by bolts (not illustrated in the figures) to be screwed into the nuts 5. Further, an impeller shell 6 of an impeller composing the torque converter is fixed to the transmission-side end of the tubular portion 2b by welding.

The turbine hub 3 is disposed in the inner peripheral part of the turbine. The turbine hub 3 has: a tubular portion 3a extending in the axial direction; and a flange portion 3b extending from the tubular portion 3a to the outer peripheral side. The inner peripheral part of a turbine shell is fixed to the flange portion 3b of the turbine hub 3 by a plurality of screw members 7. Further, a spline hole 3c is formed in the inner periphery of the tubular portion 3a of the turbine hub 3 such that an input shaft of the transmission is engaged therewith.

Lock-up Device

The lock-up device 1 is a mechanism disposed in the space produced between the turbine and the front cover 2 in order to mechanically couple the both components on an as-needed basis.

The lock-up device 1 mainly includes a piston 10, a first plate 11, a second plate 12, rivets 13 as support members for coupling the plates 11 and 12, eight outer peripheral side torsion springs 14, six inner peripheral side torsion springs 15 and a support member 16.

Piston

Figure 3:
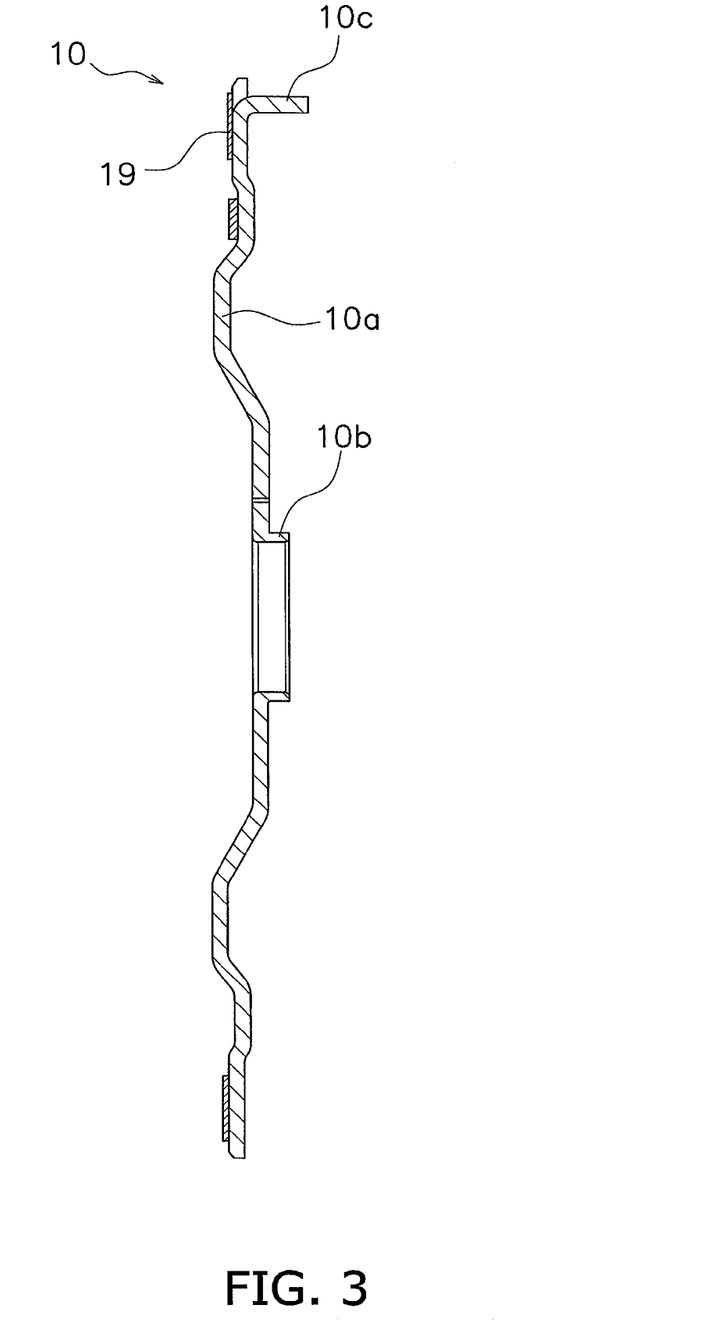
FIG. 3 is a cross-sectional view of a piston.
Figure 4:
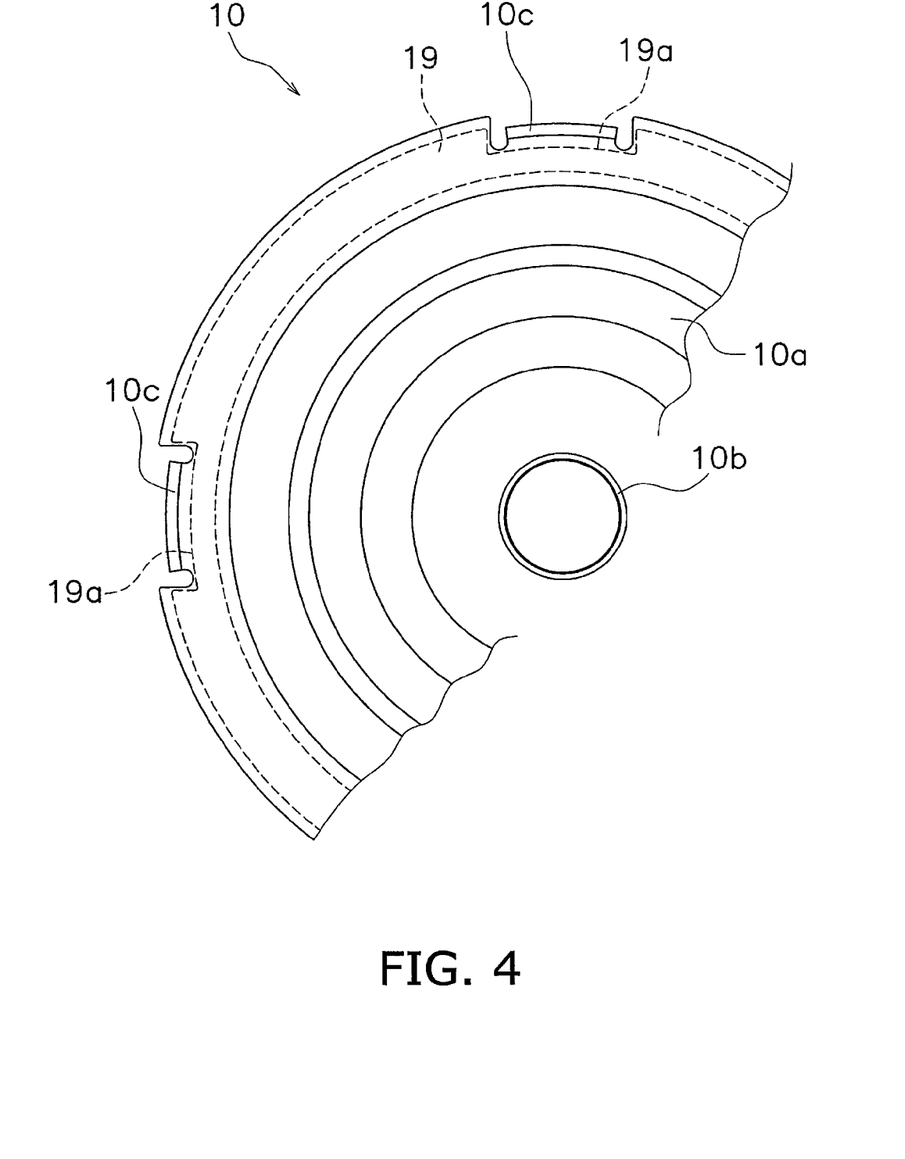
FIG. 4 is a front view of the piston.

FIGS. 3 and 4 illustrate the piston 10. FIG. 4 is a view of the piston 10 seen from the transmission side. The piston 10 has an annular disc portion 10a, a tubular portion 10b and four engaging portions 10c. The tubular portion 10b is formed in a shape protruding from the inner peripheral end of the disc portion 10a to the transmission side. The tubular portion 10b is supported by the outer peripheral surface of the tubular portion 3a of the turbine hub 3 while being slidable therewith in both of the axial direction and the rotational direction. It should be noted that as illustrated in FIG. 1, a seal member 18 is mounted to the outer peripheral surface of the tubular portion 3a of the turbine hub 3. The seal member 18 thus seals between the tubular portion 10b of the piston 10 and the tubular portion 3a of the turbine hub 3. The plural engaging portions 10c are circumferentially disposed at equal angular intervals. Each of the engaging portions 10c is formed by bending a portion, which has a predetermined length from the outer peripheral end to the inner peripheral side, of the disc portion 10a to the turbine side.

An annular friction member 19 is fixed to the outer peripheral part of the disc portion 10a of the piston 10. As illustrated in FIG. 4, the friction member 19 has cutouts 19a formed in positions corresponding to the engaging portions 10c of the piston 10. The cutouts 19a are formed from the outer peripheral part towards the inner peripheral part with a predetermined depth. In other words, the friction member 19 is not disposed in the positions that the engaging portions 10c are formed. The cutouts 19a function as lubricating oil accumulating portions and contribute to cooling of the friction member 19.

First Plate

Figure 5:
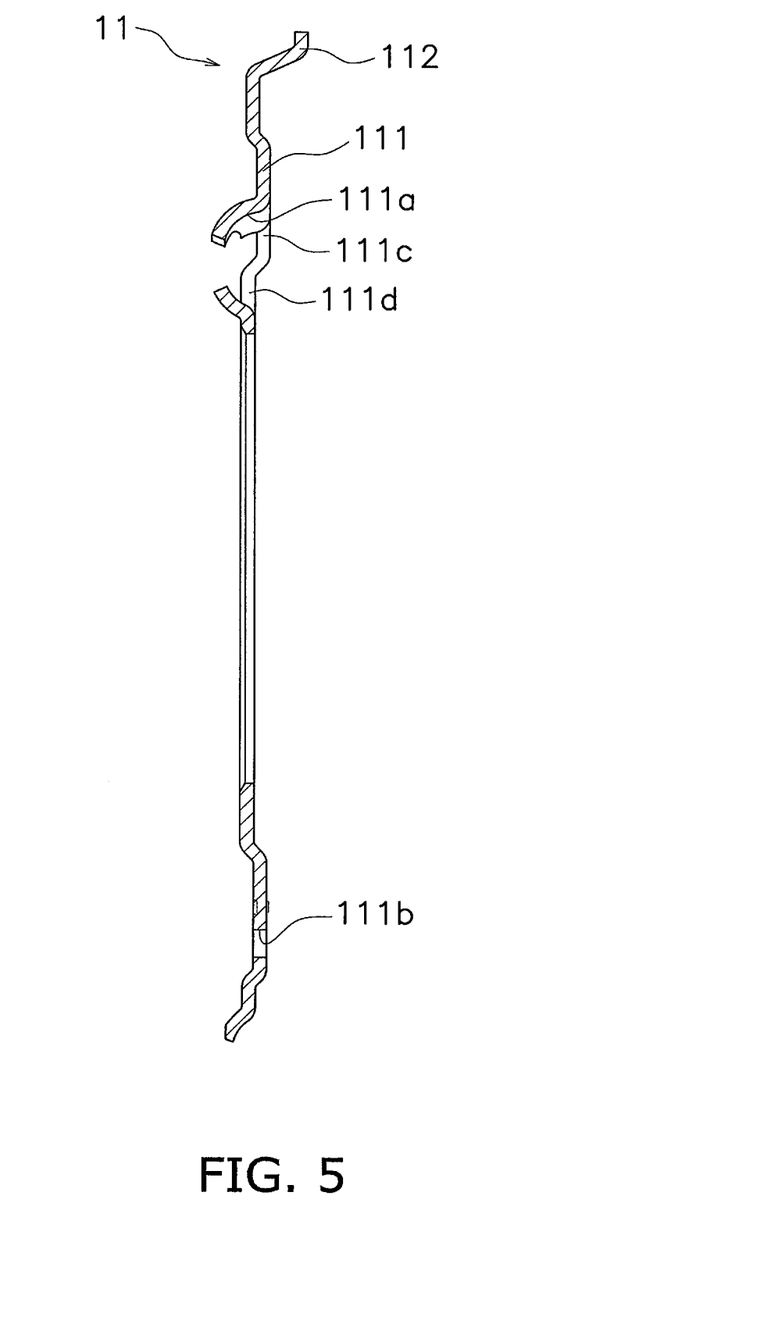
FIG. 5 is a cross-sectional view of a first plate.
Figure 6:
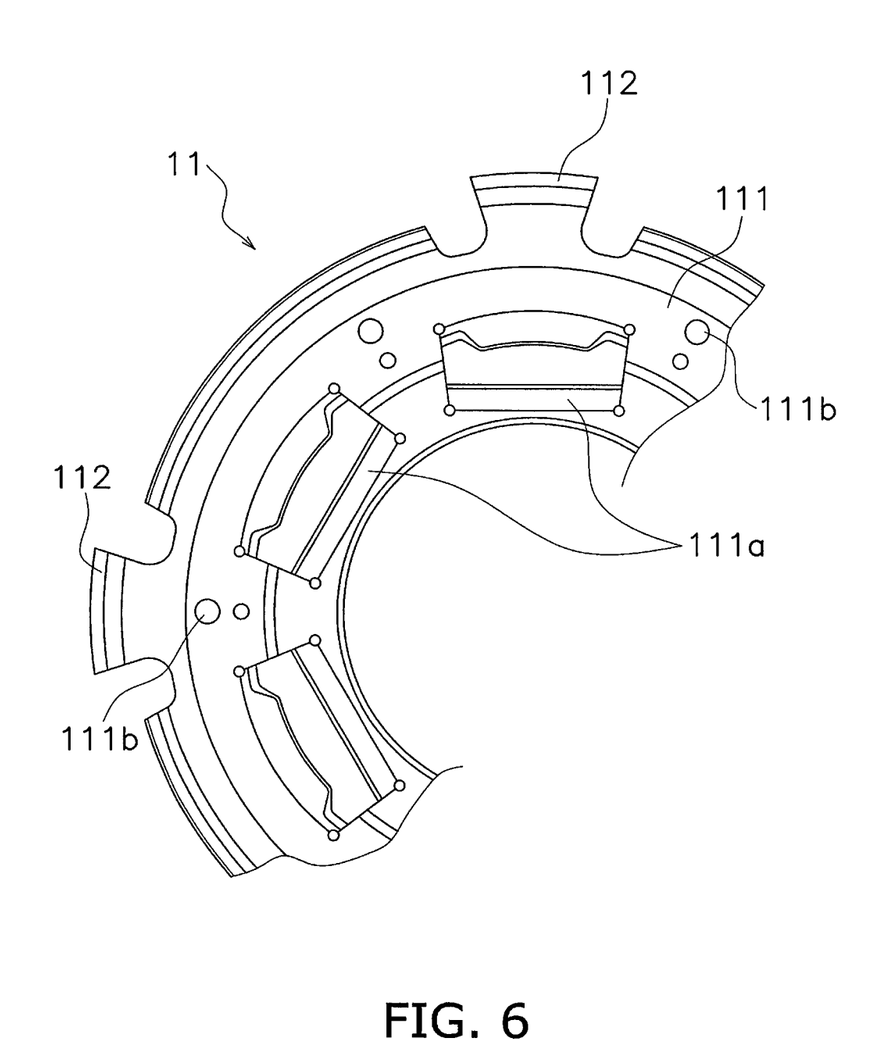
FIG. 6 is a front view of the first plate.

The first plate 11 is disposed on the transmission side of the piston 10. As illustrated in FIGS. 5 and 6, the first plate 11 has an annular disc portion 111 and four engaging portions 112 formed in a shape protruding from the outer peripheral end of the disc portion 111 to the further outer peripheral side.

Six first spring accommodating portions 111a are formed in the inner peripheral part of the disc portion 111. Further, a plurality of through holes 111b for rivets are formed in the outer peripheral part of the disc portion 111.

As is obvious from FIGS. 1 and 5, the disc portion 111 is formed such that an outer peripheral side portion 111c, i.e., a portion disposed on the outer peripheral side of the radially intermediate portion in each first spring accommodating portion 111a, and an inner peripheral side portion 111d, i.e., a portion disposed on the inner peripheral side of the radially intermediate portion in each first spring accommodating portion 111a, are axially offset from each other. Specifically, each first spring accommodating portion 111a is formed with a semicircular cross-section. The outer peripheral side portion 111c is disposed along roughly the center of each first spring accommodating portion 111a. On the other hand, the inner peripheral portion 111d is disposed so as to be shifted from the center of each first spring accommodating portion 111a to the engine side.

The engaging portions 112 are outwardly extending from the outer peripheral end of the disc portion 111, while being slanted towards the transmission. Further, the outer peripheral ends of the engaging portions 112 are bent to the further outer peripheral side so as to be in parallel to the disc portion 111.

Second Plate

Figure 7:
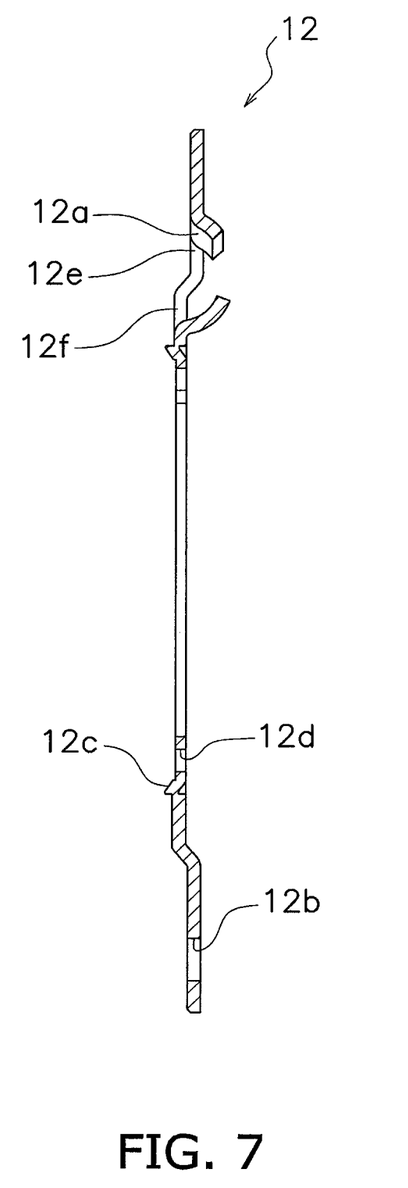
FIG. 7 is a cross-sectional view of a second plate.
Figure 8:
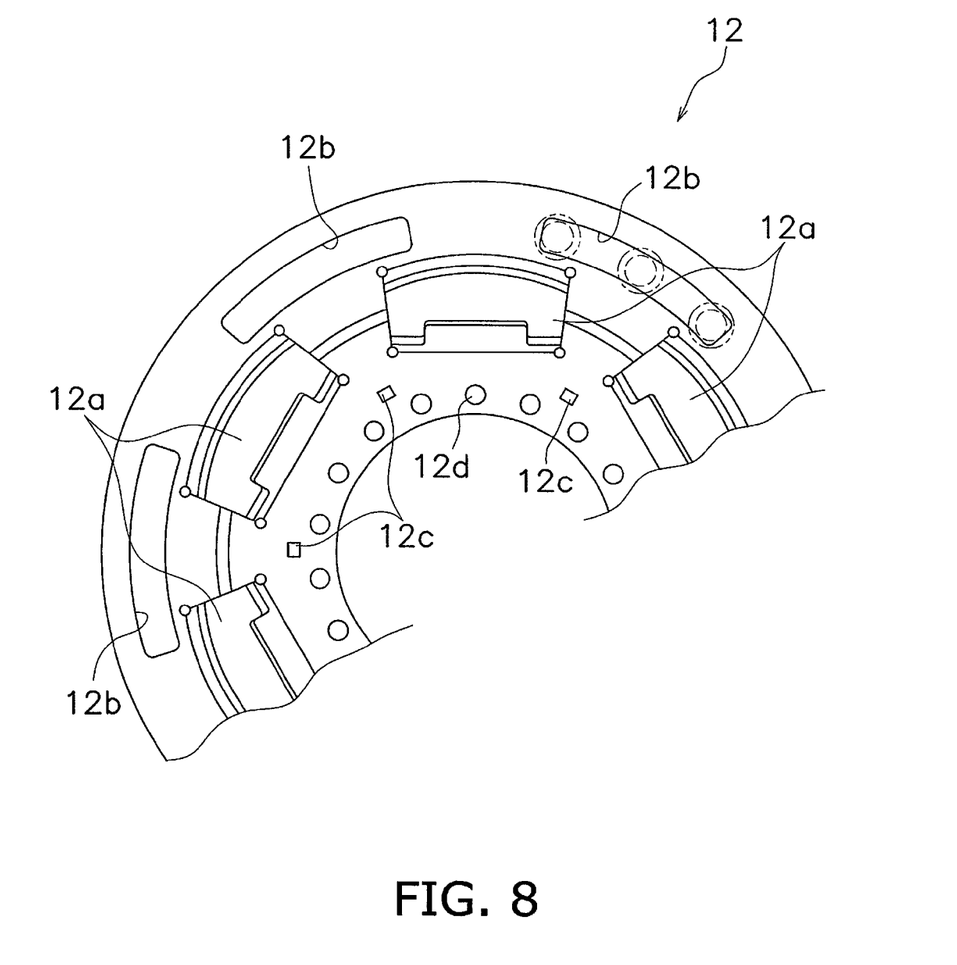
FIG. 8 is a front view of the second plate.

The second plate 12 is disposed on the transmission side of the first plate 11 while being opposed to the first plate 11. As illustrated in FIGS. 7 and 8, the second plate 12 is an annular disc member.

Six second spring accommodating portions 12a are formed in the second plate 12. The second spring accommodating portions 12a are disposed in opposition to the first spring accommodating portions 111a of the first plate 11. Similarly to each first spring accommodating portion 111a, each second spring accommodating portion 12a is formed with a semicircular cross-section.

Further, six circular-arc elongated holes 12b are formed in the second plate 12, while being disposed on the outer peripheral side of the second spring accommodating portions 12a. The circular-arc elongated holes 12b are formed in positions with the same radius and have the same predetermined circumferential length.

Further, six support protrusions 12c are formed in the second plate 12 while being disposed on the inner peripheral side of the second spring accommodating portions 12a. The respective support protrusions 12c are formed by partially embossing the second plate 12 to the engine side. Moreover, the inner peripheral end of the first plate 11 is supported by the plural support protrusions 12c, and thus, the first plate 11 is positioned in the radial direction.

Further, through holes 12d for the screw members 7 are formed on the further inner peripheral side of the support protrusions 12c. The second plate 12 is fixed to the turbine hub 3 by the screw members 7 penetrating through the through holes 12d.

As is clear from FIGS. 1 and 7, the second plate 12 is formed such that an outer peripheral side portion 12e, i.e., a portion disposed on the outer peripheral side of the radially intermediate portion in each second spring accommodating portion 12a, and an inner peripheral side portion 12f, i.e., a portion disposed on the inner peripheral side of the radially intermediate portion in each second spring accommodating portion 12a, are axially offset from each other. Specifically, the outer peripheral side portion 12e is disposed so as to be shifted from the center of each second spring accommodating portion 12a to the transmission side, whereas the inner peripheral side portion 12f is disposed along roughly the center of each second spring accommodating portion 12a.

Rivets

Figure 9:
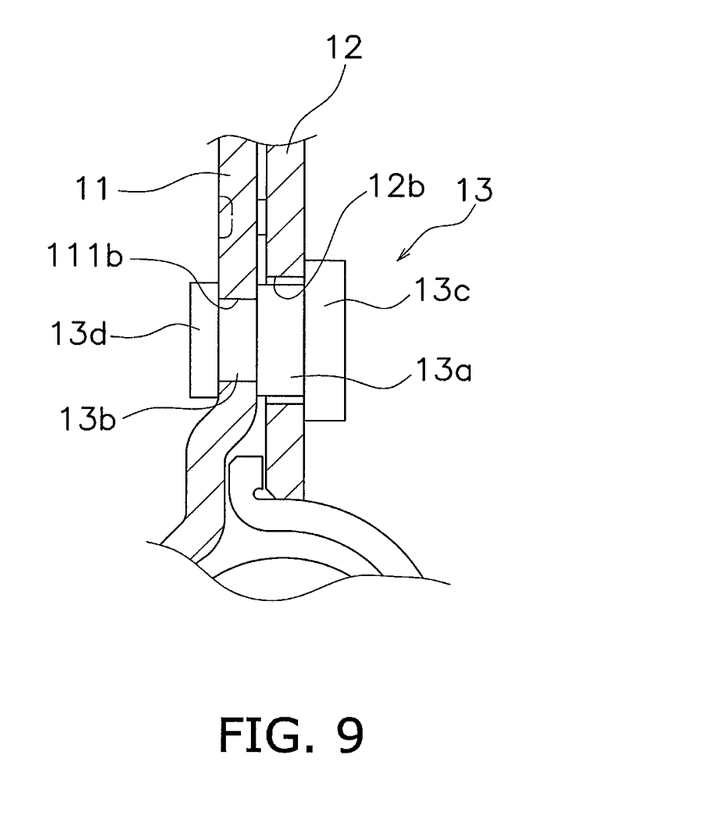
FIG. 9 is a structural view of a rivet.

FIG. 9 illustrates an enlarged view of each of the rivets 13 coupling the first plate 11 and the second plate 12. Each rivet 13 has: a first trunk portion 13a formed in a circular shape with a first diameter; a second trunk portion 13b formed in a circular shape with a second diameter smaller than the first diameter; a head portion 13c formed on one end side of the first trunk portion 13a; and a swage portion 13d formed on the other end side of the second trunk portion 13b.

The first trunk portion 13a penetrates through the elongated hole 12b bored in the second plate 12 and is circumferentially movable within the elongated hole 12b. The second trunk portion 13b penetrates through the through hole 111b for rivet in the first plate 11. The head portion 13c is formed with a diameter larger than that of the first trunk portion 13a and the elongated hole 12b bored in the second plate 12. Further, the head portion 13c makes contact with the transmission-side lateral surface of the second plate 12. The swage portion 13d is a portion to be swaged after the rivet 13 is attached to the both plates 11 and 12. After being swaged, the swage portion 13d makes contact with the engine side lateral surface of the first plate 11.

Outer Peripheral Side Torsion Springs 14

As illustrated in FIG. 2, the eight outer peripheral side torsion springs 14 are circumferentially disposed in alignment with each other, and adjacent two of them are configured to act in series. In other words, four pairs of two torsion springs 14 configured to act in series are herein provided. Each pair of the torsion springs 14 is disposed between each pair of the engaging portions 10c of the piston 10 and between each pair of the engaging portions 112 of the first plate 11. Therefore, the respective engaging portions 10c of the piston 10 and the respective engaging portions 112 of the first plate 11 can be engaged when in contact with the circumferential ends of the outer peripheral side torsion springs 14.

Inner Peripheral Side Torsion Springs

The six inner peripheral side torsion springs 15 are accommodated and held between the first spring accommodating portions 111a of the first plate 11 and the second spring accommodating portions 12a of the second plate 12. In other words, the circumferential end of each first spring accommodating portion 111a and that of each second spring accommodating portion 12a can be engaged when in contact with the circumferential ends of each inner peripheral side torsion spring 15.

Support Member

As illustrated in FIG. 1, the support member 16 is a member for supporting the outer peripheral side torsion springs 14, and is disposed while being rotatable relatively to the piston 10, the first plate 11 and the second plate 12. The support member 16 has an outer periphery support portion 16a, a lateral part support portion 16b, an inner periphery support portion 16c, an inner protruding portion 16d and engaging portions 16e.

The outer periphery support portion 16a is a portion for supporting the outer peripheral side part of each outer peripheral side torsion spring 14 and prevents each outer peripheral side torsion spring 14 from jumping out to the outer peripheral side. The lateral part support portion 16b is formed so as to extend from the transmission-side end of the outer periphery support portion 16a to the inner peripheral side. The lateral part support portion 16b supports the transmission-side lateral part of each outer peripheral side torsion spring 14. The inner periphery support portion 16c is a portion for supporting the inner peripheral side part of each outer peripheral side torsion spring 14.

The inner periphery support portion 16c is axially extending from the lateral part support portion 16b to the engine side. The inner peripheral surface of the inner periphery support portion 16c is supported by the outer peripheral end surface of the second plate 12. In other words, the support member 16 is radially positioned by the outer peripheral end surface of the second plate 12.

The inner protruding portion 16d is formed by bending the engine-side end of the inner periphery support portion 16c to the inner peripheral side. The inner protruding portion 16d is disposed while being interposed between the outer peripheral end portion of the first plate 11 and that of the second plate 12. With the structure, the support member 16 is axially positioned by the first plate 11 and the second plate 12.

Each engaging portion 16e is composed of a portion formed by partially bending the engine-side tip end of the outer periphery support portion 16a to the inner peripheral side; and a portion formed by partially bending the lateral part support portion 16b to the engine side. As illustrated in FIG. 2, each engaging portion 16e is disposed between each pair of the outer peripheral side torsion springs 14 configured to act in series, while in contact with the circumferential ends of the paired outer peripheral side torsion springs 14.

Actions

When the speed of a vehicle becomes a predetermined speed or greater, the piston 10 is moved towards the front cover 2, and the friction member 19 is pressed onto the friction surface 2c of the front cover 2. When the friction member 19 is pressed onto the front cover 2, torque of the front cover 2 is transmitted from the piston 10 to the outer peripheral side torsion springs 14 through the engaging portions 10c of the piston 10. The torque, which is transmitted from the piston 10 to the outer peripheral side torsion springs 14, is further transmitted to the inner peripheral side torsion springs 15 through the engaging portions 112 and the first spring accommodating portions 111a of the first plate 11. The torque, which is transmitted to the inner peripheral side torsion springs 15, is transmitted to the turbine hub 3 through the second spring accommodating portions 12a. In other words, the front cover 2 is mechanically coupled to the turbine hub 3, and the torque of the front cover 2 is directly outputted to the input shaft of the transmission through the turbine hub 3.

Features (1) The engaging portions 10c, which are engaged with the outer peripheral side torsion springs 14, are formed by partially bending the piston 10. Therefore, it becomes unnecessary to provide a retaining plate that has been provided for a well-known device. Accordingly, the axial dimension, and further, the number of components are herein reduced in comparison with those of the well-known device.

(2) The cutouts 19a are disposed in positions corresponding to the piston engaging portions 10c of the friction member 19, and thus function as lubricating oil accumulating portions. Therefore, cooling performance is herein enhanced.

(3) The outer peripheral side torsion springs 14 are restricted from moving to the inner peripheral side and the outer peripheral side by the support member 16, while being restricted from axially moving by the piston 10 and the support member 16. Therefore, the piston 10 is not required to be provided with a structure for restricting moving of the outer peripheral side torsion springs 14. The piston 10 is thereby simply structured.

(4) The support member 16 is axially and radially positioned by the first plate 11 and the second plate 12. Therefore, the structure for positioning the support member 16 is simply formed.

(5) Through the pair of plates 11 and 12 that accommodate the inner peripheral side torsion springs 15, torque is inputted into the inner peripheral side torsion springs 15 and is also outputted from the inner peripheral side torsion springs 15 to the turbine hub 3. In other words, the input-side part and the output-side part for the inner peripheral side torsion springs 15 are composed of the pair of the plates 11 and 12. Therefore, it is possible to reduce the axial length of the torque input-side and output-side parts for the inner peripheral side torsion springs 15. Further, the number of components can be herein reduced.

(6) A part of the first plate 11, which is located on the outer peripheral side of the inner peripheral side torsion springs 15, is disposed along the center of the inner peripheral side torsion springs 15. On the other hand, a part of the second plate 12, which is located on the inner peripheral side of the inner peripheral side torsion springs 15, is disposed along the center of the inner peripheral side torsion springs 15. Therefore, the torsion springs 15 can be smoothly compressed even when the input-side part and the output-side part for the inner peripheral side torsion springs 15 are respectively composed of the pair of the plates 11 and 12.

(7) The plural support protrusions 12c are formed on the second plate 12 in order to support the inner peripheral end of the first plate 11. Further, the first plate 11 is radially positioned by the plural support protrusions 12c. Therefore, the structure for axis-aligning the first plate 11 is simply formed.

(8) The engaging portions 10c, which are engaged with the outer peripheral side torsion springs 14, are formed by partially bending the piston 10. Therefore, it becomes unnecessary to provide a retaining plate that has been provided for a well-known device.

(9) The support member 16 is axially and radially positioned by the first plate 11 and the second plate 12. Therefore, the structure for positioning the support member 16 is simply formed.

Industrial Applicability

According to the lock-up device of the present invention, the axial dimension thereof and the number of components thereof can be reduced, and thereby, the manufacturing cost thereof can be reduced. Especially, in the lock-up device, the axial length of the part for supporting the elastic members can be reduced, and thus, the entire axial length of the torque converter can be reduced.

Other Exemplary Embodiments

The present invention is not limited to the exemplary embodiment as described above, and a variety of changes or modifications can be made without departing from the scope of the present invention.

According to the present invention as described above, in the lock-up device, the axial dimension can be reduced while the number of components can be reduced, and thereby, manufacturing cost can be reduced. Especially, it is possible to reduce the axial length of the part for supporting the elastic members in the lock-up device, and thereby, the axial length of the entire torque converter can be reduced.

The invention claimed is:

1. A lock-up device for a torque converter, the lock-up device being disposed between a front cover coupled to an engine-side member and a turbine of the torque converter, the lock-up device being configured to mechanically transmit torque from the front cover to the turbine, the lock-up device comprising:

a piston having a friction member on a front-cover-side lateral surface thereof, the piston being configured to be axially moved in order for the friction member to be pressed onto or separated away from the front cover, the piston having a plurality of first engaging portions formed by partially bending the piston towards the turbine;

an output plate coupled to the turbine; and a first elastic member and a second elastic member disposed between the piston and the output plate, the first and second elastic members being configured to transmit torque from the piston towards the output plate, the piston being an annular plate member, and each of the plurality of first engaging portions of the piston having a predetermined length from an outer peripheral end portion of the piston towards an inner periphery of the piston., the friction member being an annular member attached to the outer peripheral end portion of the piston, the friction member having a plurality of cutouts in positions corresponding to the plurality of first engaging portions disposed in the outer peripheral end portion of the piston, and the first elastic member including circumferential ends being engaged with the plurality of first engaging portions of the piston.

2. The lock-up device as recited in claim 1, further comprising a support member rotatably disposed relative to the piston and the output plate, a third elastic member disposed between the piston and the output plate, the third elastic member being configured to transmit torque from the piston towards the output plate, the first and second elastic members being most adjacent among the first, second, and third elastic members, the support member being configured to cause the first and second elastic members to act in series, the support member including an outer periphery support portion covering an outer peripheral side part of the first elastic member, a lateral part support portion covering a lateral part of the first elastic member on an opposite side of the piston, and an inner periphery support portion covering an inner peripheral side part of the first elastic members.

3. The lock-up device as recited in claim 2, wherein the support member further has an inner protruding portion extending from the inner periphery support portion to a further inner peripheral side, the support member is positioned by an inner peripheral side surface of the inner periphery support portion of the support member making contact with an outer peripheral end surface of the second plate, and the support member is positioned by the inner protruding portion of the support member being disposed between the outer peripheral part of the first plate and an outer peripheral part of the second plate.

4. The lock-up device as recited in claim 1, wherein the output plate further includes a first plate having a plurality of second engaging portions on an outer peripheral part thereof, the plurality of second engaging portions being engaged with circumferential ends of the first and second elastic members, the first plate including a first elastic member accommodating portion to accommodate an inner peripheral side elastic member, and a second plate being coupled to the turbine, the second plate including a second elastic member accommodating portion disposed axially in opposition to the first elastic member accommodating portion to accommodate the inner peripheral side elastic member, and the lock-up device further includes
a support member supporting the second plate such that the second plate is rotatable relative to the first plate within a predetermined angular range and is axially immovable relative to the first plate, and the inner peripheral side elastic member being disposed on an inner peripheral side of the first elastic member, the inner peripheral side elastic member is configured between the first elastic member accommodating portion and the second elastic member accommodating portion.

5. The lock-up device as recited in claim 4, wherein the second plate has a plurality of elongated holes having a circular-arc shape, the elongated holes circumferentially extends, the support member includes a circular trunk portion passing through an elongated hole, a head portion having a diameter larger than a diameter of the trunk portion, and a swage portion being swaged to a lateral surface of the first plate on an opposite side of the second plate, and the head portion makes contact with a lateral surface of the second plate on an opposite side of the first plate.

6. The lock-up device as recited in claim 4, wherein the first plate is contactable with an axially middle part of both circumferential ends of the inner peripheral side elastic member on an outer peripheral side of the inner peripheral side elastic member, and the second plate is contactable with an axially middle part of both circumferential ends of the inner peripheral side elastic member on an inner peripheral side of the inner peripheral side elastic member.

7. A lock-up device for a torque converter, the lock-up device being disposed between a front cover coupled to an engine-side member and a turbine of the torque converter, the lock-up device being configured to mechanically transmit torque from the front cover to the turbine, the lock-up device comprising:

a piston disposed to be axially movable;

a clutch part configured to transmit torque from the front cover to an output side in conjunction with moving of the piston;

a first plate into which torque is inputted from the front cover through the clutch part, the first plate having a first elastic member accommodating portion;

a second plate coupled to the turbine, the second plate having a second elastic member accommodating portion, the second elastic member accommodating portion being disposed axially in opposition to the first elastic member accommodating portion;

a support member supporting the second plate in order for the second plate to be rotatable relative to the first plate within a predetermined angular range and to be axially immovable relative to the first plate; and a first elastic member being disposed axially between the first elastic member accommodating portion and the second elastic member accommodating portion, both circumferential ends of the first elastic member being configured to be engaged with a circumferential end of the first elastic member accommodating portion and a circumferential end of the second elastic member accommodating portion, the first elastic member elastically coupling the first plate and the second plate in a rotational direction, the second plate having a plurality of support protrusions, the plurality of support protrusions being disposed on an inner peripheral portion of the second plate coupled to the turbine, and the plurality of support protrusions protruding towards the first plate, and the first plate having an annular shape, and an inner peripheral end of the first plate being radially positioned by the plurality of support protrusions.

8. The lock-up device as recited in claim 7, wherein
the piston is a plate member disposed between the front cover and the first elastic member, and
the clutch part includes a friction member fixed to a front-cover-side lateral surface of the piston.

9. The lock-up device as recited in claim 8, further comprising
a plurality of outer peripheral side elastic members disposed on an outer peripheral side of the first elastic member, the plurality of outer peripheral side elastic members circumferentially and elastically coupling the piston and the first plate,
the first plate having a plurality of first-plate-side engaging portions on an outer peripheral end portion thereof,
the first-plate-side engaging portions being configured to be engaged with circumferential ends of the plurality of outer peripheral side elastic members.

10. The lock-up device as recited in claim 9, wherein
the piston has a plurality of piston-side engaging portions,
the piston-side engaging portions being formed by partially bending an outer peripheral part of the piston towards the transmission, and
the piston-side engaging portions being engaged with the circumferential ends of the plurality of outer peripheral side elastic members.

11. The lock-up device as recited in claim 9, further comprising
a support member disposed to be rotatable relative to the piston and the first plate, the support member causing the plurality of outer peripheral side elastic members to act in series, the support member including an outer periphery support portion covering an outer peripheral side part of each of the plurality of outer peripheral side elastic members, a lateral part support portion covering one lateral part of each of the plurality of outer peripheral side elastic members, and an inner periphery support portion covering an inner peripheral side part of each of the plurality of outer peripheral side elastic members,
the support member further including an inner protruding portion extending from the inner periphery support portion to a further inner peripheral side,
the support member being radially positioned by an inner peripheral surface of the inner periphery support portion making contact with an outer peripheral end surface of the second plate, and
the support member being axially positioned by the inner protruded portion being disposed between an outer peripheral part of the first plate and an outer peripheral part of the second plate.

12. A lock-up device for a torque converter, the lock-up device being disposed between a front cover coupled to an engine-side member and a turbine of the torque converter, the lock-up device being configured to mechanically transmit torque from the front cover to the turbine, the lock-up device comprising:
a piston having a friction member on a front-cover-side lateral surface thereof, the piston being configured to be axially moved in order for the friction member to be pressed onto or separated away from the front cover, the piston having a plurality of first engaging portions formed by partially bending the piston towards the turbine;
an output plate coupled to the turbine;
a first elastic member and a second elastic member disposed between the piston and the output plate, the first and second elastic members being configured to transmit torque from the piston towards the output plate, the first elastic member including circumferential ends being engaged with the plurality of first engaging portions of the piston;
a support member rotatably disposed relative to the piston and the output plate; and
a third elastic member disposed between the piston and the output plate, the third elastic member being configured to transmit torque from the piston towards the output plate;
the first and second elastic members being most adjacent among the first, second, and third elastic members,
the support member being configured to cause the first and second elastic members to act in series, and
the support member including an outer periphery support portion covering an outer peripheral side part of the first elastic member, a lateral part support portion covering a lateral part of the first elastic member on an opposite side of the piston, and an inner periphery support portion covering an inner peripheral side part of the first elastic members.

* * * * *